(12) United States Patent
Eapen et al.

(10) Patent No.: US 9,965,275 B2
(45) Date of Patent: May 8, 2018

(54) ELEMENT SIZE INCREASING INSTRUCTION

(71) Applicant: ARM LIMITED, Cambridge (GB)

(72) Inventors: Jacob Eapen, Cambridge (GB); Mbou Eyole, Cambridge (GB); Simon Hosie, San Jose, CA (US)

(73) Assignee: ARM Limited, Cambridge (GB)

( * ) Notice: Subject to any disclaimer, the term of this patent is extended or adjusted under 35 U.S.C. 154(b) by 237 days.

(21) Appl. No.: 14/814,582

(22) Filed: Jul. 31, 2015

(65) Prior Publication Data

US 2017/0031682 A1 Feb. 2, 2017

(51) Int. Cl.
*G06F 9/30* (2006.01)

(52) U.S. Cl.
CPC ...... *G06F 9/30036* (2013.01); *G06F 9/30014* (2013.01); *G06F 9/30018* (2013.01); *G06F 9/30025* (2013.01); *G06F 9/30032* (2013.01)

(58) Field of Classification Search
CPC ............ G06F 9/30036; G06F 9/30032; G06F 9/30014; G06F 9/30018; G06F 9/30025
USPC .......................................... 712/4, 5, 7, 9, 22
See application file for complete search history.

(56) References Cited

U.S. PATENT DOCUMENTS

| | | | | |
|---|---|---|---|---|
| 5,892,960 A * | 4/1999 | Seide | ................ | G06F 7/48 704/231 |
| 6,202,141 B1 | 3/2001 | Diefendorff et al. | | |
| 6,212,617 B1 * | 4/2001 | Hardwick | ............. | G06F 8/457 345/505 |
| 6,324,638 B1 * | 11/2001 | Elmer | ................ | G06F 7/5324 712/11 |
| 7,197,625 B1 * | 3/2007 | van Hook | ........... | G06F 9/30032 710/50 |
| 2002/0027552 A1 | 3/2002 | Lee | | |
| 2003/0167460 A1 * | 9/2003 | Desai | ................ | G06F 1/3228 717/151 |
| 2005/0125476 A1 | 6/2005 | Symes et al. | | |
| 2008/0016320 A1 * | 1/2008 | Menon | ............... | G06F 9/30014 712/22 |
| 2010/0115233 A1 * | 5/2010 | Brewer | ............... | G06F 9/30036 712/7 |
| 2012/0124332 A1 * | 5/2012 | Yi | ................... | G06F 9/30149 712/3 |

(Continued)

FOREIGN PATENT DOCUMENTS

| | | |
|---|---|---|
| EP | 0 751 456 | 1/1997 |
| GB | 2 517 254 | 2/2015 |

OTHER PUBLICATIONS

International Search Report and Written Opinion of the International Searching Authority dated Jul. 21, 2016 in PCT/GB2016051501, 12 pages.

*Primary Examiner* — Yuqing Xiao

(74) *Attorney, Agent, or Firm* — Nixon & Vanderhye P.C.

(57) ABSTRACT

An apparatus comprises processing circuitry to generate a result vector including at least one N-bit data element in response to an element size increasing instruction identifying at least a first input vector including M-bit data elements, where N>M. First and second forms of the element size increasing instruction are provided for generating the result vector using first and second subsets of data elements of the first input vector respectively. Positions of the first and second subsets of data elements in the first input vector are interleaved.

20 Claims, 11 Drawing Sheets

(56) References Cited

U.S. PATENT DOCUMENTS

2013/0185538 A1\* 7/2013 Hung .................. G06F 15/76
            712/3
2016/0070571 A1\* 3/2016 Boersma ............. G06F 9/3887
            712/22

\* cited by examiner

ELEMENT SIZE INCREASING INSTRUCTION

BACKGROUND

Technical Field

The present technique relates to the field of data processing. More particularly, it relates to processing of vectors having multiple data elements.

Technical Background

Some data processing apparatuses may support vector processing in which a given processing operation may be performed on each data element of a vector to generate corresponding data elements of a result vector. This allows a number of different data values to be processed with a single instruction, to reduce the number of program instructions required to process a given number of data values. Vector processing can also be referred to as SIMD (single instruction, multiple data) processing.

SUMMARY

At least some examples provide an apparatus comprising:
processing circuitry to generate a result vector comprising a plurality of result data elements in response to an element size increasing instruction identifying at least a first input vector comprising a plurality of M-bit data elements, where the result data elements comprise at least one N-bit data element, where N>M;
wherein in response to a first form of the element size increasing instruction, the processing circuitry is configured to generate the result vector using a first subset of data elements of the first input vector;
in response to a second form of the element size increasing instruction, the processing circuitry is configured to generate the result vector using a second subset of data elements of the first input vector; and
positions of the first subset of data elements in the first input vector are interleaved with positions of the second subset of data elements in the first input vector.

At least some examples provide an apparatus comprising:
means for generating a result vector comprising a plurality of result data elements in response to an element size increasing instruction identifying at least a first input vector comprising a plurality of M-bit data elements, where the result data elements comprise at least one N-bit data element, where N>M;
wherein in response to a first form of the element size increasing instruction, the means for generating is configured to generate the result vector using a first subset of data elements of the first input vector;
in response to a second form of the element size increasing instruction, the means for generating is configured to generate the result vector using a second subset of data elements of the first input vector; and
positions of the first subset of data elements in the first input vector are interleaved with positions of the second subset of data elements in the first input vector.

At least some examples provide a data processing method comprising:
in response to an element size increasing instruction identifying at least a first input vector comprising a plurality of M-bit data elements, generating a result vector comprising a plurality of result data elements, where the result data elements comprise at least one N-bit data element, where N>M;
wherein in response to a first form of the element size increasing instruction, the result vector is generated using a first subset of data elements of the first input vector;
in response to a second form of the element size increasing instruction, the result vector is generated using a second subset of data elements of the first input vector; and
positions of the first subset of data elements in the first input vector are interleaved with positions of the second subset of data elements in the first input vector.

At least some examples provide a computer program stored on a computer readable storage medium that, when executed by a data processing apparatus, provides a virtual machine which provides an instruction execution environment corresponding to the apparatus described above. The computer readable storage medium may be a non-transitory storage medium.

Further aspects, features and advantages of the present technique will be apparent from the following description of examples, which is to be read in conjunction with the accompanying drawings.

DESCRIPTION OF EXAMPLES

Figure 1:
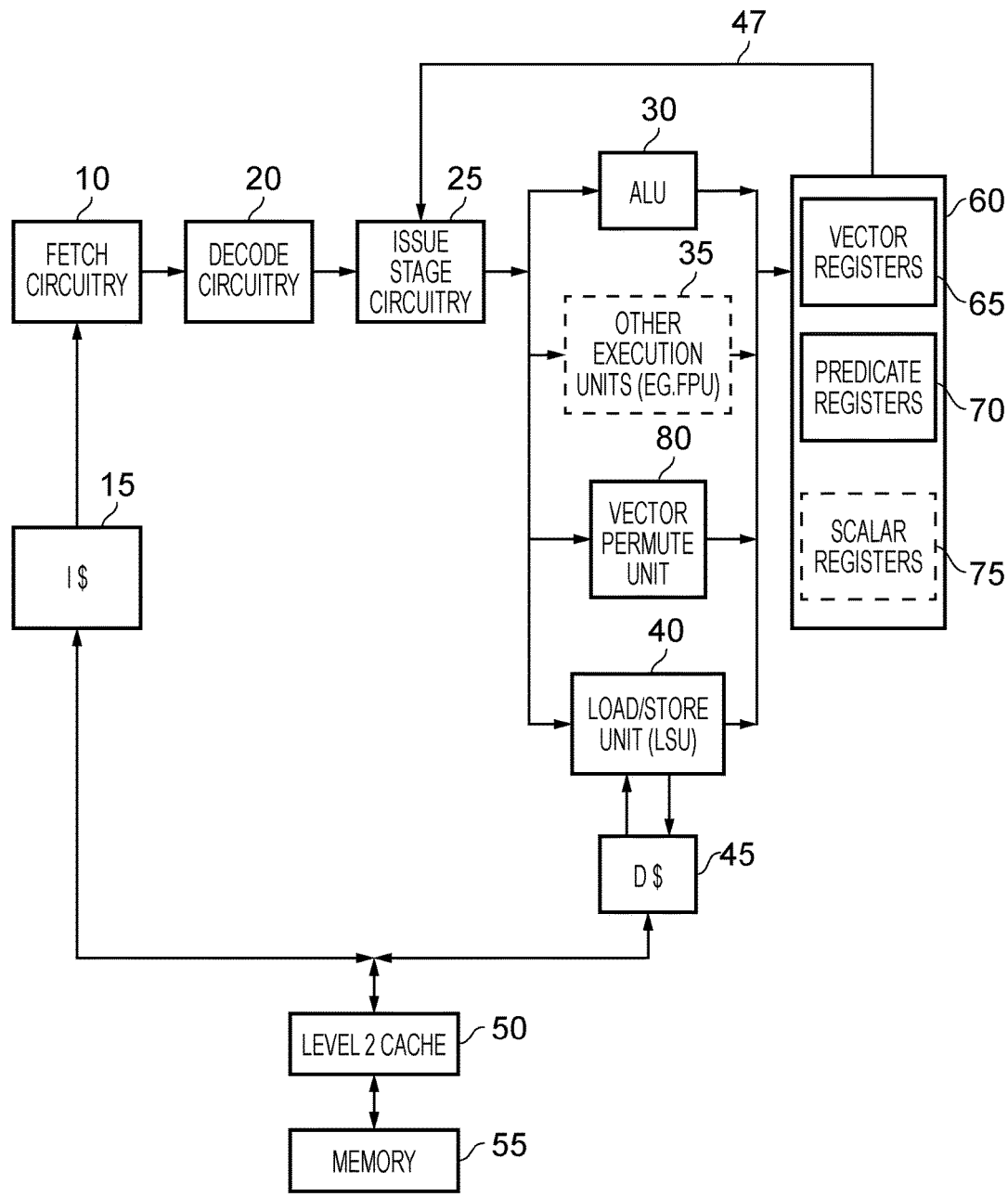
FIG. 1 schematically illustrates an example of a data processing apparatus supporting vector processing.

Some specific examples will be discussed below. It will be appreciated that the present technique is not limited to these particular examples.

Some apparatuses may support processing of vectors with different data element sizes. Hence, an element size increasing instruction may be supported which operates on at least a first input vector comprising a number of M-bit data elements to generate a result vector comprising a number of result data elements, where the result data elements include at least one N-bit data element and N>M. For example, the element size increasing instructions could simply convert data elements having a certain number of bits into higher precision values, or could also perform a certain processing operation (e.g. a multiply operation) on the input M-bit data elements to generate larger N-bit data elements. Since the result vector may have fewer elements than the input vector, a subset of the input M-bit data elements may be used to generate the N-bit data elements of the result and other M-bit data elements of the input vector may not be considered.

One approach for selecting which M-bit data elements of the input vector are to be processed may be to provide a single form of element size increasing instruction which operates on a default subset of the M-bit data elements of the element size increasing instruction (e.g. only the lower portion of the M-bit data elements, or only even-numbered data elements 0, 2, 4 . . . of the input vector). However, to process elements which are not in the default positions accessed by the element size increasing instruction, it would be necessary to first perform an unpacking operation to move the values of interest to the default data element positions. Such unpacking operations can require additional instructions to be executed which can reduce performance, as well as additional registers to accommodate the unpacked values.

Another approach may be to provide one form of the element size increasing instruction which operates on the elements in the lower part of the input vector, and another form of the element size increasing instruction which operates on the elements in the upper part of the input vector. While this allows the instructions to operate directly on packed data in the original input vector without needing unpacking operations, it can be less efficient in hardware because it may require longer cross paths to be provided in the processing circuitry for routing bits of data elements at one end of the input vector to processing lanes for generating result data elements at the other end of the result vector. Such cross wiring can be difficult to route in a chip, and is not typically required for other vector processing operations, and so leads to increased circuit area and power consumption.

In contrast, the present technique provides first and second forms of the element size increasing instruction which control the processing circuitry to generate the result vector using respective first and second subsets of data elements of the first input vector, where the positions of the first and second subsets of data elements in the first input vector are interleaved. The first and second forms of the element size increasing instruction may correspond to the same kind of processing operation, but may target different subsets of data elements of the input vector. The interleaving of the first and second subset of data elements targeted by the first and second forms of the instruction enables more efficient processing circuitry to be implemented in hardware because it requires less cross path wiring as discussed above. Also, the provision of (at least) two different forms of the instruction for targeting respective interleaved subsets means that unpacking of data elements is not required and so performance can be improved and register utilisation made more efficient.

In general, the processing circuitry may generate each N-bit data element of the result vector based on a corresponding M-bit data element of the first input vector, which is selected in dependence of which form of the element size increasing instruction is being executed by the processing circuitry.

For example, each N-bit data element of the result vector may correspond to a group of M-bit elements of the input vector, with the group including one M-bit data element from each subset. The processing circuitry may select one M-bit data element from the group, depending on which form of the element size increasing instruction is being executed, and use this to generate the corresponding N-bit data element. The bit positions of the group of M-bit data elements within the first input vector may be coincident with the bit positions of the corresponding N-bit data element in the result vector. The processing for generating each N-bit data element may be confined to a processing lane corresponding to N bits of the first input vector, and so there is no need for any cross links between different N-bit portions of the input vector, making the processing circuitry more efficient in terms of hardware.

In some cases, the result vector may also depend on a mask comprising mask values for indicating which M-bit data elements of at least the first input vector are active data elements. This can allow certain data elements to be flagged as inactive, with the operation associated with the element size increasing instruction being performed on the active elements to generate the result.

Another advantage of providing first/second forms of the element size increasing instruction as discussed above is that it allows both instructions to operate directly on a mask corresponding to a packed vector. In contrast, if only a single element size increasing instruction was supported, then as well as unpacking the vector elements themselves as discussed above, it would also be necessary to manipulate the mask in a corresponding way to control processing of the unpacked vector, which can further increase the overhead of the unpacking operations. In contrast, the first/second forms of the element size increasing instruction described above may both operate on a subset of mask values of the same mask. In some cases, the first and second forms of the instruction may use respective first and second subsets of the mask values, which may be interleaved in the mask in a corresponding way to the interleaved subsets of data elements of the input vectors. In other examples, the first and second forms of the instruction may both use the same subset of the mask values regardless of the form of the instruction.

The allocation of which elements belong to the first or second subset of elements may be hardwired in the processing circuitry (i.e. in response to an indication of which form of the instruction is being executed, the hardware accesses the appropriate subset of elements). This may be independent of the particular mask values being used for a given instruction. The mask may affect which data elements within the relevant subset are considered, but may not influence whether a given element is considered part of the first subset or second subset.

In some cases, the element size increasing instruction may implement a doubling of a number of bits in each element, i.e. N=2M. In this case, the first subset of data elements may comprise the even-numbered data elements of the first input vector and the second subset of data elements may comprise the odd-numbered data elements of the first input vector. For instructions which have more than one input vector, similar subsets of data elements may be selected from other input vectors. By providing two forms of instruction which target even- and odd-numbered elements respectively, this allows more efficient hardware implementation for the reasons given above.

Other forms of the instruction with N=2M may allocate the elements to the interleaved first and second subsets in a different way. For instructions where the vector length is not an exact integer multiple of N, some M-bit elements of the input vector may not be mapped to corresponding N-bit elements of the result, so may be skipped and may not be considered to be part of the first or second subsets. The first and second subsets may correspond to every other element of those elements which correspond to N-bit elements of the input vector. If one M-bit element is skipped, this can lead to the first and second subsets each comprising a mixture of odd- and even-numbered elements.

Some systems may support element size increases by multiples greater than 2. In this case, there may be more than two forms of the element size increasing instruction to target further subsets of data elements. For example, if N=4M, then third and fourth forms of the instruction may also be provided for targeting third and fourth subsets of M-bit data elements of the first input vector, with the first, second, third and fourth subsets of data elements being interleaved. Similarly, for N=8M, third to eighth forms of the instruction may target third to eight subsets of data elements of the first input vector, with the first to eighth subsets being interleaved. Hence, the first and second forms of the element size increasing instruction may be just two of a range of forms of instruction which implement a same data processing operation but target different subsets of elements of the input vector.

Each M-bit data element may have a corresponding mask value which indicates whether it is inactive or active. For each N-bit data element of the result vector, a corresponding M-bit data element is selected based on the form of the instruction being executed. When the corresponding M-bit data element is indicated by the mask value as active, then the processing circuitry may generate the N-bit data element based on a result of a predetermined operation applied to the corresponding M-bit data element (and in some cases also dependent on an element of a further input vector as mentioned below). On the other hand, when the corresponding M-bit data element is indicated to be inactive, the N-bit data element may be generated with a value independent of the result of the predetermined operation applied to the corresponding M-bit data element.

There are different options for generating the N-bit data element in the inactive case. The N-bit data element could be set to a fixed value such as zero, or the M-bit data element could be mapped directly to a corresponding N-bit value without any predetermined operation being applied (other than the change in precision), or the N-bit data elements corresponding to active M-bit data elements could be written into a destination register with the other N-bit data elements corresponding to inactive M-bit data elements taking the value which was previously stored in the corresponding portions of the destination register.

In some cases, in addition to at least one N-bit data element, the result vector may comprise at least one J-bit data element, where J<N. In some cases, the J-bit data elements of the result vector could be treated in a similar way to an inactive lane of processing as discussed above. Alternatively, the processing circuitry may generate the J-bit data element(s) with a value corresponding to a J-bit portion of an N-bit result of performing a predetermined processing operation using a corresponding M-bit data element of the first input vector. Hence, a smaller result data element could be generated in a similar way to the N-bit data elements, but reduced to a narrower bit width. Different versions of the first/second/further element size increasing instructions could be provided corresponding to different selections of which J bits of the N-bit result are mapped to the J-bit data element in the result vector.

In general, the processing circuitry may generate a given N-bit data element by performing a predetermined operation using the corresponding M-bit data element of at least the first input vector. A number of different versions of the element size increasing instruction can be provided, corresponding to different operations being applied as the predetermined operation, with each version having at least a first form and second form (and possibly further forms) as discussed above.

For example, the predetermined operation could be a conversion operation to change the precision of the value represented by the corresponding M-bit data element from M bits to N bits. In this case, the first input vector may be the only input vector. There need not be any other mathematical or logical operation applied. The conversion operation may simply convert an M-bit value into an equivalent N-bit value, for those lanes where the mask indicates an active element.

In other examples, the result of the predetermined operation may depend on the corresponding M-bit data element of the first input vector as well as a corresponding data element of at least one further input vector. For example, the predetermined operation could be an arithmetic operation applied to corresponding elements in two, three or more input vectors (e.g. add, subtract, multiply or divide, multiply-add, multiply subtract). The operation could be a fixed point or floating point operation.

In some cases data elements of the further input vector may be M-bit data elements (i.e. the same size as the elements of the first input vector). In this case, the form of the element size increase instruction being executed also determines which elements of the further input vector are used to generate the result vector.

For other types of instruction, the further input vector may have N-bit data elements which are the same size as the data elements of the result vector. For instance, a vector add instruction could add M-bit data elements of a first input vector to N-bit data elements of a further input vector to produce N-bit data elements. By allowing smaller data elements to be combined directly with larger data elements, this avoids the need for executing two separate instructions to perform the add and convert the data element size respectively.

The first and second forms of the element size increasing instruction (and if provided, third, fourth or further forms) can be distinguished from each other in different ways. In some cases the different forms of the element size increasing instruction may have different opcodes. Alternatively, the different forms of the element size increasing instruction could have the same opcode and the element size increasing instruction may include a field which specifies which form of the instruction is being executed.

FIG. 1 is a block diagram of a system in which the techniques of the described embodiments may be employed. In the example shown in FIG. 1, the system takes the form of a pipelined processor. Instructions are fetched from an instruction cache 15 (which is typically coupled to memory 55 via one or more further levels of cache such as a level 2 cache 50) by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40, 80 within the pipelined processor. The execution pipelines 30, 35, 40, 80 may collectively be considered to form processing circuitry.

The issue stage circuitry 25 has access to the registers 60 in which data values required by the operations can be stored. In particular source operands for vector operations may be stored within the vector registers 65, and source operands for scalar operations may be stored in the scalar registers 75. In addition, one or more predicates (masks) may be stored in predicate registers 70, for use as control information for the data elements of vector operands processed when performing certain vector operations. One or more of the scalar registers may also be used to store data values used to derive such control information for use during performance of certain vector operations.

The source operands and any associated control information can be routed via a path 47 into the issue stage circuitry, so that they can be dispatched to the appropriate execution unit along with the control signals identifying the operation(s) to be performed to implement each decoded instruction. The various execution units 30, 35, 40, 80 shown in FIG. 1 are assumed to be vector processing units for operating on vector operands, but separate execution units (not shown) can be provided if desired to handle any scalar operations supported by the apparatus.

Considering the various vector operations, arithmetic operations may for example be forwarded to the arithmetic logic unit (ALU) 30 along with the required source operands (and any control information such as a predicate), in order to enable an arithmetic or logical operation to be performed on those source operands, with the result value typically being output as a destination operand for storing in a specified register of the vector register bank 65.

In addition to the ALU 30, other execution units 35 may be provided, for example a floating point unit (FPU) for performing floating point operations in response to decoded floating point instructions, and a vector permute unit 80 for performing certain permutation operations on vector operands. In addition, a load/store unit (LSU) 40 is used for performing load operations in order to load data values from the memory 55 (via the data cache 45 and any intervening further levels of cache such as level 2 cache 50) into specified registers within the register sets 60, and for performing store operations in order to store data values from those registers back to the memory 55.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) may be provided, for example register renaming circuitry to map the architectural registers specified by the instructions to physical registers from a pool of physical registers within the register bank 45 (the pool of physical registers typically being larger than the number of architectural registers), thereby enabling certain hazards to be removed, facilitating more use of out of order processing. In addition, a reorder buffer may typically be provided to keep track of the out of order execution, and to allow the results of the execution of the various instructions to be committed in order.

In the described embodiments, the circuitry of FIG. 1 is arranged to execute vector operations on vector operands stored in the vector registers 65, where a vector operand comprises a plurality of data elements. For certain vector operations performed on such a vector operands (such as arithmetic operations), the required operation may be applied in parallel (or iteratively) to the various data elements within the vector operand. Predicate information (also known as a mask) may be used to identify which data elements within a vector are active data elements for a particular vector operation, and hence are data elements to which the operation should be applied.

Figure 2:
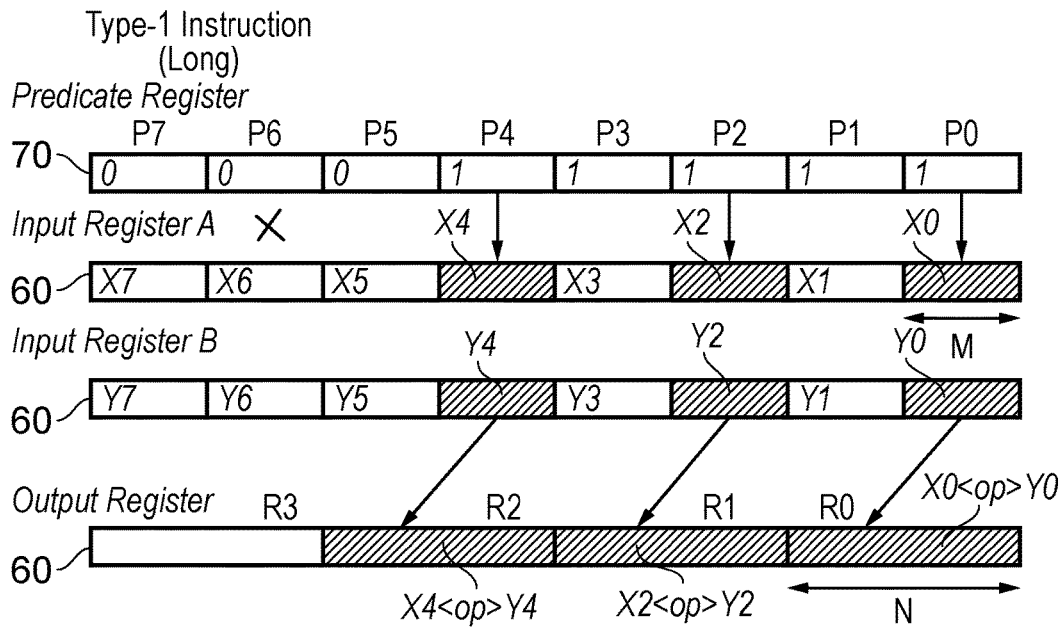
FIGS. 2 and 3A illustrate first and second forms of an element size increasing instruction.
Figure 3A:
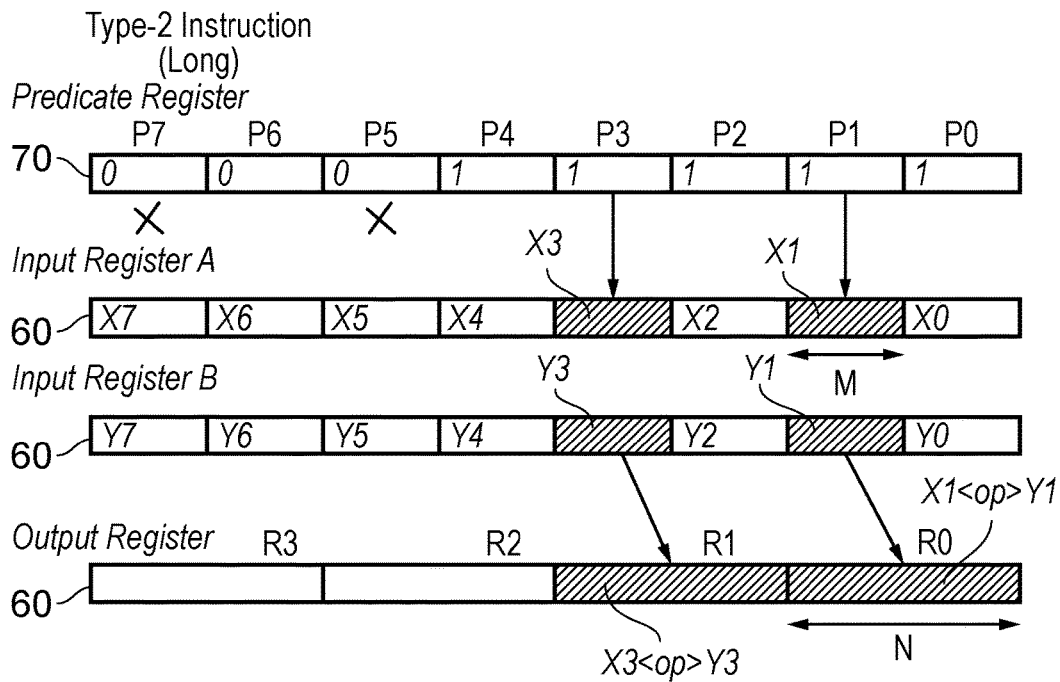

FIGS. 2 and 3A show examples of first and second forms of an element size increasing instruction which may be supported by the data processing apparatus for FIG. 1. FIGS. 2 and 3A show an element lengthening instruction which takes two input vectors A, B with M-bit data elements and generates an output vector R with N-bit data elements, where N=2M. The input vectors are read from vector registers 60 and the output vector is written back to the vector registers 60. A predicate register 70 provides mask information controlling which elements of the input vectors are active. The predicate register 70 to be accessed could be implicit from the identification of the input registers 60, or could be explicitly encoded in the instruction encoding.

FIG. 2 shows a first form of the lengthening instruction (type 1 instruction) which operates on a first subset of data elements of the input vectors A, B, comprising the even-numbered data elements at position 0, 2, 4, 6. Similarly, the type 1 instruction uses a subset of predicate (mask) bits corresponding to the even-numbered predicate bits P0, P2, P4, P6. Result elements R0, R1, R2, R3 are generated using lanes 0, 2, 4, 6 of the input registers respectively. In each case, if the corresponding predicate value Pn is 1, then the result element is set to the result of performing a given processing operation <op> on the corresponding elements Xn, Yn of the input registers A, B. The operation <op> could be any arithmetic, logical or shift operation, for example, and could be a fixed-point or floating-point operation. In this example, predicate bits P0, P2, P4 are all 1, and so elements R0-R2 take values X0<op>Y0, X2<op>Y2 and X4<op>Y4 respectively. On the other hand, if the predicate for a given lane is 0, then the corresponding result data element is independent of the result of the processing operation <op> on the corresponding input elements. For example, in this example result data element R3 is independent of the result of X6<op>Y6 which it would have had if predicate P6 had been 1. In the case where a predicate bit is 0, the corresponding result data element R3 could be set to a fixed value, e.g. 0, or the corresponding input element X6 or Y6 could be mapped directly to an equivalent N-bit value for the result (rather than being processed using operation <op>), or the previous value of the corresponding portion of the output register could be retained for element R3. Which of these options is used could be hardwired for a given implementation, or could be selected based on configuration information in a control register to allow the user to select which is used, or could be selected based on a parameter encoded in the instruction encoding. For the type-1 instruction shown in FIG. 2, the odd-numbered input elements X1, X3, X5, X7, Y1, Y3, Y5, Y7 and predicate values P1, P3, P5, P7 do not affect the result, regardless of the input values or the predicate values.

FIG. 3A shows a second form of the lengthening instruction corresponding to the same type of operation <op> as the first form in FIG. 2. Again, it operates on two input registers A, B with M-bit data elements and a predicate register, to generate a result vector with N-bit data elements, and again N=2M. However, the second form of the lengthening instruction acts on the odd-numbered input data elements at positions 1, 3, 5, 7 of the respective input registers, and the corresponding odd-numbered predicate bits of the predicate register P1, P3, P5, P7. For example, when predicate bit P1 is 1, result element R0 is set based on the result of X1<op>Y1. Similarly, R1, R2, R3 correspond to similar operations applied to lanes 3, 5 and 7 of the inputs and predicate register. In this example, as predicate values P5, P7 are 0, result elements R2, R3 are independent of the result of the operation <op> applied to the elements in lanes 5 and 7.

Hence, the type 1 and type 2 instructions shown in FIGS. 2 and 3A correspond to the same operation, but target different first and second subsets of data elements which are interleaved within the input registers. The first subset of data elements comprises elements 0, 2, 4 and 6 and the second subset comprises elements 1, 3, 5, 7. This approach has several advantages as explained below with respect to FIGS. 4 and 5.

Figure 4:
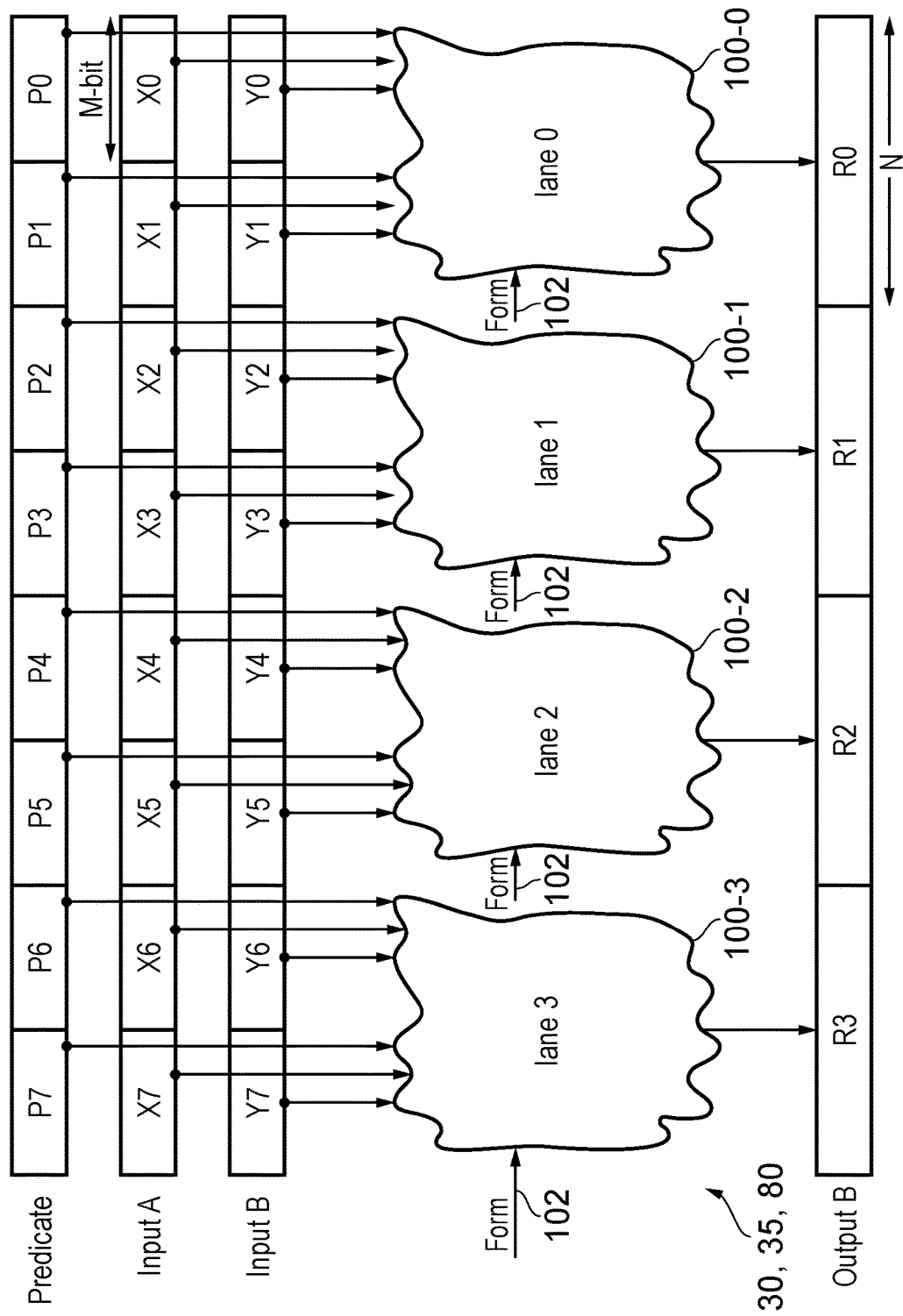
FIG. 4 shows an example of parallel processing lanes provided in hardware for processing respective elements of vectors.

FIG. 4 shows an example of some hardware which can be provided within one of the execute units 30, 35, 80 for implementing instructions at the type shown in FIGS. 2 and 3A. Which execute unit 30, 35, 80 executes the instruction depends on the type of operation being performed (e.g. a floating point operation may be executed by floating point unit 35, while a fixed point arithmetic operation may be executed by ALU 30).

As shown in FIG. 4 the execute unit 30, 35, 80 may include a number of processing blocks 100 for performing respective lanes of processing. Each lane may correspond to one N-bit result element of the output vector and to a group of two M-bit data elements in each of the input vectors, with the group comprising one even-numbered element and one odd-numbered element (i.e. one element from each of the first and second subsets targeted by the respective first and second forms of the instruction). For example the processing circuitry 100-0 for lane 0 receives elements X0, Y0, X1, Y1 of the input vectors and the corresponding predicate bits P0, P1. The processing circuitry 100-0 also receives an instruction form signal 102 indicating which form of the instruction is being executed, and based on the instruction form signal selects either elements X0, Y0 and predicate bit P0 or elements X1, Y1 and predicate bit P1, and uses these to generate the result value R0 for that lane. Similarly, the circuitry 100-1, 100-2, 100-3 for the other three lanes 1, 2, 3 operates in a corresponding way to generate the other result elements R1, R2, R3.

Note that each processing lane corresponds to a self-contained unit of processing applied to N bits of the input registers whose bit position in the input registers is coincident with the bit position in the output register of the corresponding N-bit result data element being generated. For example, the elements X0, X1 of input register A are at the lowest N bits of the input register A, and this corresponds exactly to the lowest N bits of the output register at which the corresponding result data element R0 is placed. This means that there is no need for any cross-links between N-bit processing lanes. There is no need for example for bit values in the top half of the input registers to be considered when generating result data elements in the bottom half of the output register. This is because the first and second forms of the instruction target interleaved subsets of data elements respectively. In contrast, if the first and second forms of the instruction targeted the top and bottom half of the input registers respectively, there would be a need for cross paths linking input elements X4, Y4 to result element R0 for example, which would not generally be needed for other operations, and so would increase the hardware circuit area and power consumption and make it harder to route the required paths in a hardware circuit. By providing first and second forms of the instruction as discussed above, this added hardware complexity can be avoided.

Figure 5:
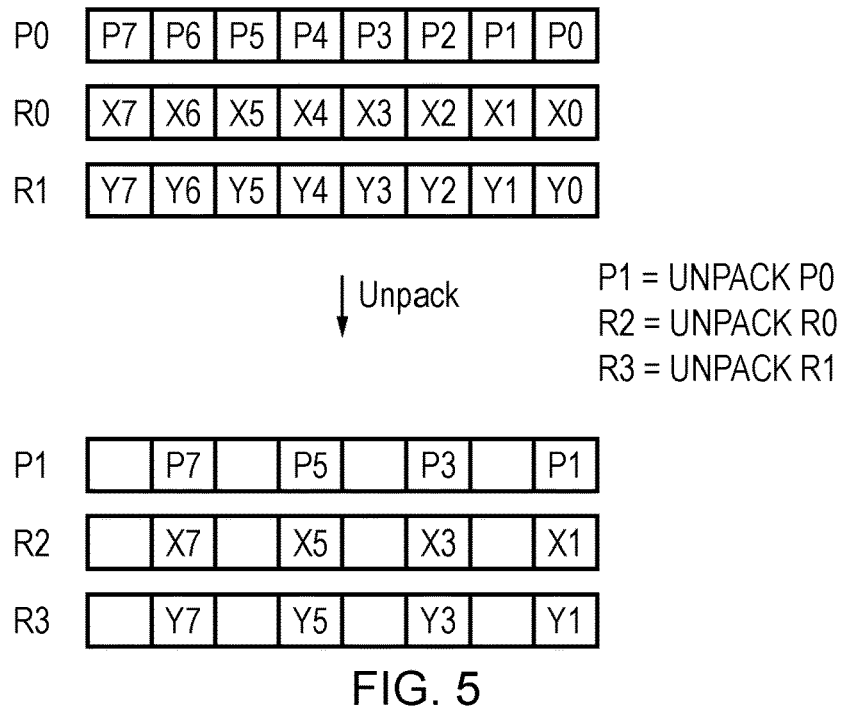
FIG. 5 shows an example of an unpacking operation which can be avoided when first and second forms of an element size increasing instruction are provided.

FIG. 5 shows another advantage of the provision of first and second forms and an instruction as shown in FIGS. 2 and 3A. An alternative approach would be to support only an instruction of the type shown in FIG. 2, which targets only the even-numbered data elements 0, 2, 4, 6. However, if the programmer then wishes to apply the same operation to the odd-numbered elements 1, 3, 5, 7, they would first need to perform an unpacking operation using permute unit 80 as shown in FIG. 5, to move those odd numbered elements 1, 3, 5, 7 to the even numbered positions 0, 2, 4, 6 in a second register, before executing the type 1 instruction on the second register. As shown in FIG. 5, the unpacking operations may require as many as three additional instructions to be executed, one for unpacking each of the two input registers and the predicate register. These additional instructions reduce performance because they will delay processing of the element size increasing instructions. Also, as shown in FIG. 5, unpacking the input registers requires three additional registers P1, R2, R3 to be used which would not be needed if the element size increasing instruction could be executed directly on packed data in the original registers P0, R0, R1. Register space may be at a premium and if additional registers have to be used for the unpacking then this reduces the number of registers available for other purposes which can lead to other instructions being delayed while waiting for registers to become available. Also, as shown in FIG. 5, following the unpacking operation half the data elements of the unpacked registers R2, R3 are empty, so space in the register file is wasted compared to if the instructions are executed directly on packed vectors.

In contrast, by using first and second forms of the instructions shown in FIGS. 2 and 3A which operate on interleaved subsets of data elements respectively, the unpacking operations shown in FIG. 5 can be avoided, because the programmer can simply select to use the type 1 instruction or the type 2 instruction depending on whether the elements of interest are in the even-numbered or odd-numbered positions in the input vectors. In practice, it is common for the programmer to wish to apply the same operation to all of the data elements of the input vector, so it is common for one instance of each form of the instruction to be executed. In this case, another benefit is that the same predicate value in the predicate register can be used for both the forms of the instruction, since each form of the instruction picks out the relevant bits of the predicate register. It is not necessary to manipulate the predicate value as shown in FIG. 5.

In the example of FIG. 3A, for the type 2 instruction, the odd-numbered predicate bits P1, P3, P5, P7 are considered, to determine whether lanes 1, 3, 5, 7 of the input registers are active or inactive. Hence, the type 2 instruction uses a second subset of mask values which is interleaved with the first subset P0, P2, P4, P6 used by the type 1 instruction shown in FIG. 2.

Figure 3B:
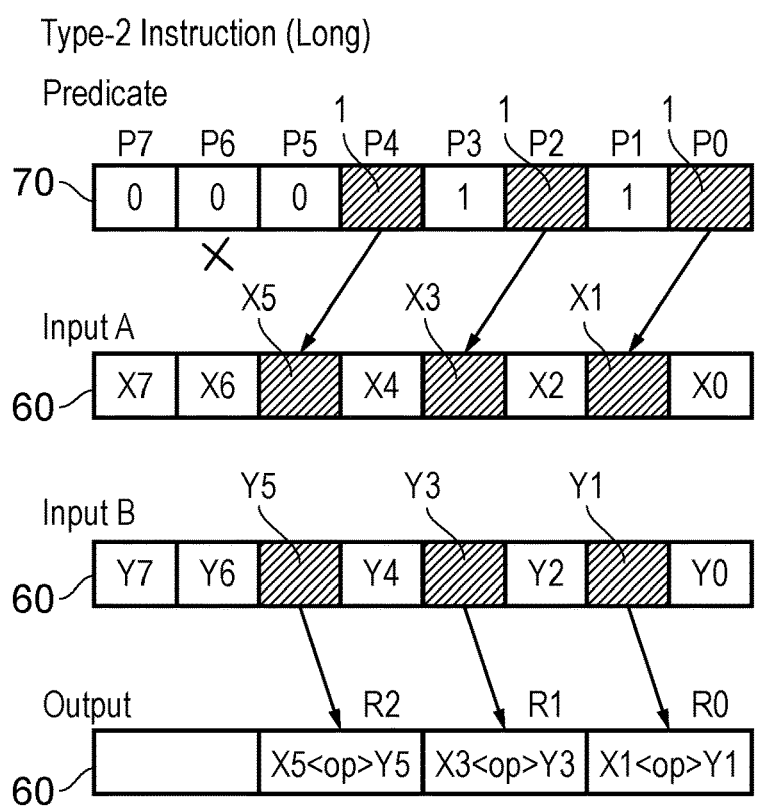
FIG. 3B illustrates an alternative implementation of a second form of an element size increasing instruction.

FIG. 3B shows an alternative way of using the predicate information for the type 2 instruction. In this case, while the type 2 instruction still targets the odd-numbered elements of the input registers A, B (X1, X3, X5, X7 and Y1, Y3, Y5, Y7), the type 2 instruction still uses the even-numbered predicate values P0, P2, P4, P6 of the predicate register 70. Hence, in this case the subset of predicate values (mask values) used is the same as for the type 1 instruction. In this case, the predicate values P0, P2, P4, P6 can effectively be considered to be associated with the corresponding result data elements R0, R1, R2, R3 to indicate which lanes are active or inactive (which implicitly also identifies whether the corresponding lanes 1, 3, 5, 7 of input elements are active or inactive). If the predicate P0, P2, P4, P6 for a given lane R0, R1, R2, R3 is 1 then the corresponding result data element is set based on the result of the operation <op> applied to the corresponding odd-numbered input data elements 1, 3, 5, 7, while if the predicate is 0 then the corresponding result data element is independent of the result of this operation.

Figure 6:
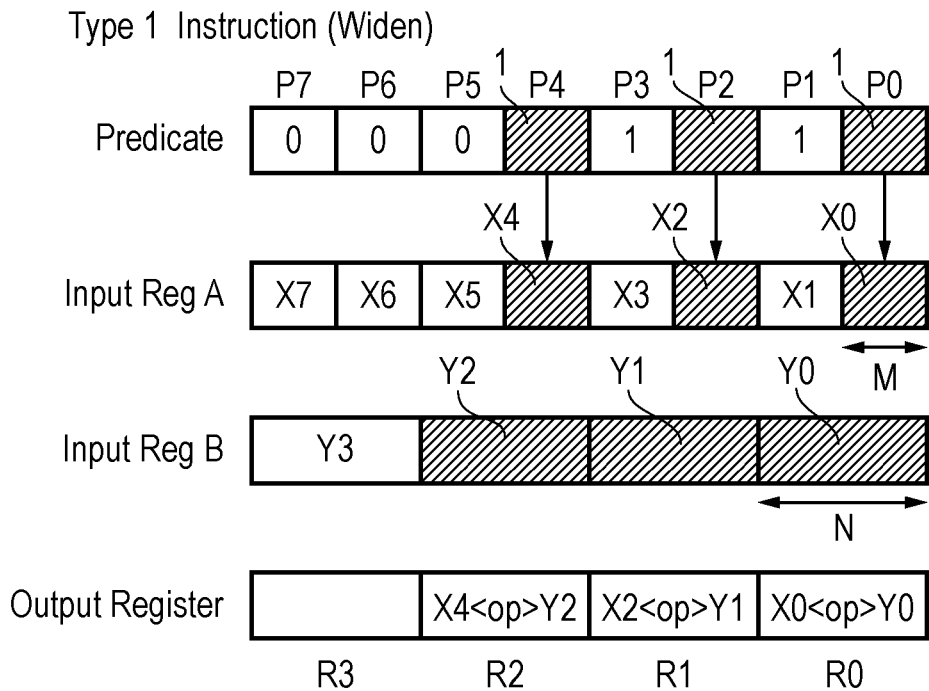
FIGS. 6 and 7 show another example of first and second forms of an element size increasing instruction.
Figure 7:
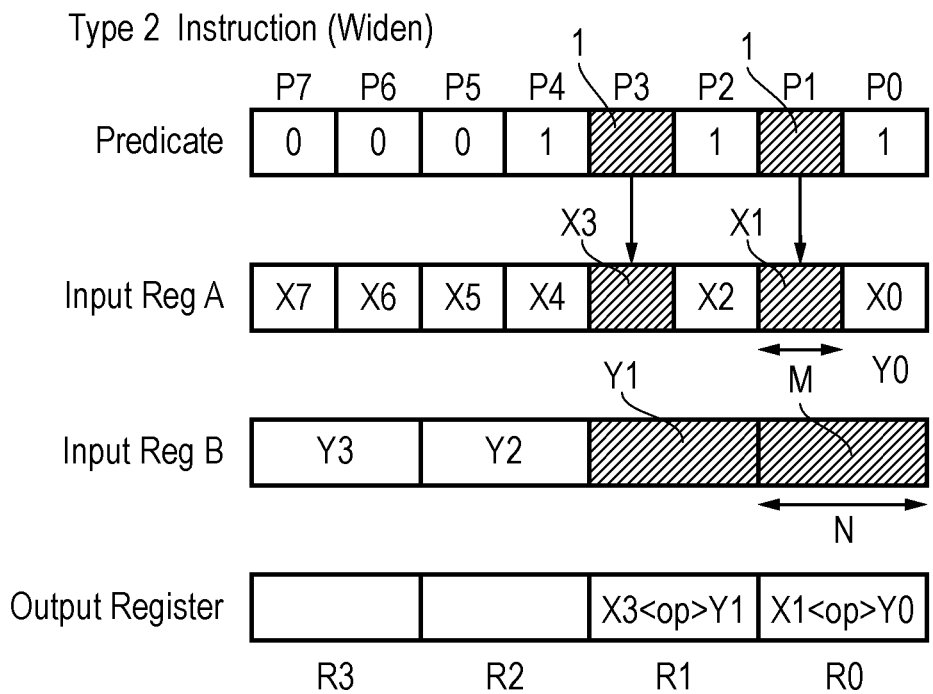

FIGS. 6 and 7 show another example of first and second forms of element size increasing instruction. This example shows a widening instruction for which the first input register A has M-bit data elements, but the second input register B has N-bit data elements of the same size as the result vector (again N=2M in this example). Hence, both type 1 and type 2 instructions use the same N-bit elements of the second input register B, but select different even- or odd-numbered elements of the first input register A depending on the type of instruction being executed. Otherwise the operation is similar to the example of FIGS. 2 and 3A/3B. Again, the particular processing operation <op> used could be any arithmetic, logical or shift operation.

Figure 8:
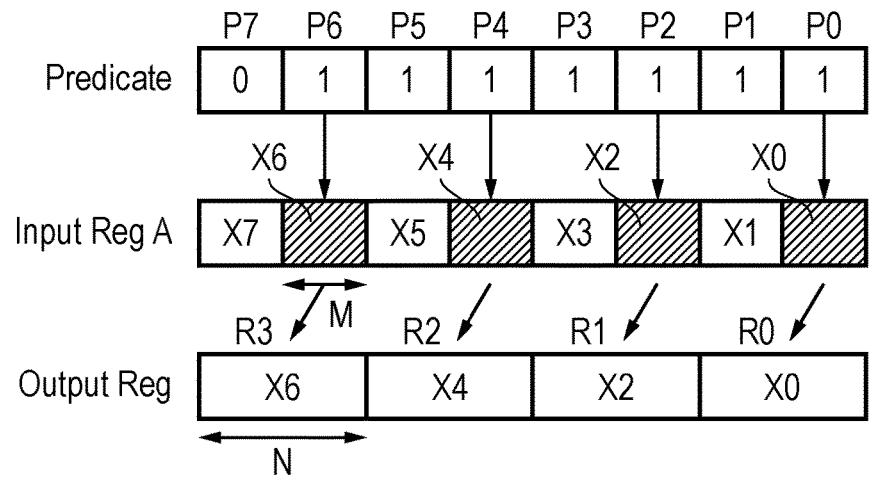
FIGS. 8 and 9 show a third example of first and second forms of an element size increasing instruction.
Figure 9:
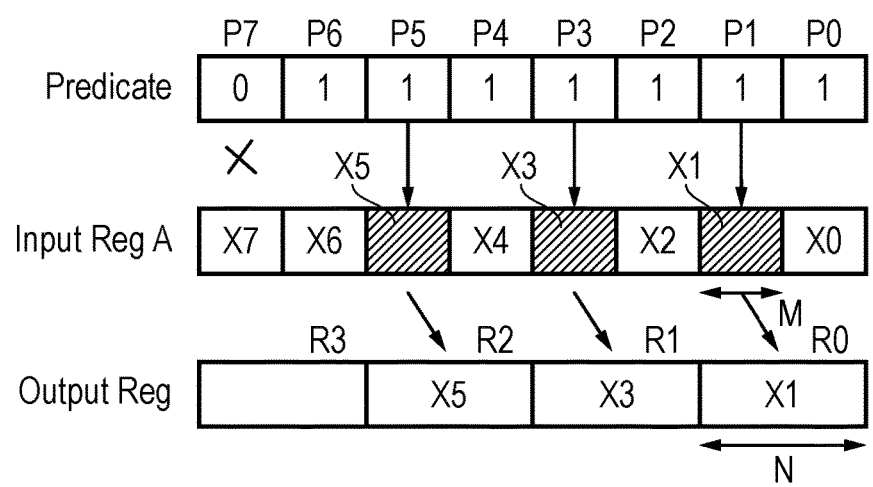

FIGS. 8 and 9 show another example in which conversion instructions can be implemented with first and second forms of the instruction. This time there is no second input register and when a given lane is active, the predetermined operation performed on the corresponding element of the input is simply a conversion operation to change the precision of the data value from M bits to N bits. For example, the M-bit data element could be padded with sign bits at the most significant end to generate an N-bit data element (in the case of two's complement fixed point values), or could be converted to a new format (in the case of a floating point value). Again, whether the result is set based on the even- or odd-numbered elements of the input depends on whether the type 1 or type 2 instruction is being executed—for the type 1 result elements R0, R1, R2, R3 correspond to input elements X0, X2, X4, X6, and for type 2 the result elements R0, R1, R2, R3 correspond to input elements X1, X3, X5, X7 respectively.

FIGS. 7 and 9 show examples which are similar to that of FIG. 3A in that the type 2 instructions use the odd-numbered predicate bits P1, P3, P5, P7 to determine whether the corresponding lanes are active. However, it would also be possible to implement these similar to FIG. 3B so that they consider the even-numbered predicate bits P0, P2, P4, P6 when generating result data elements R0, R1, R2, R3 using the odd-numbered input elements 1, 3, 5, 7 respectively.

Also, while not illustrated in the drawings, other examples of the lengthening or widening instruction could operate on three or more input vectors. For example a multiply accumulate instruction may take as inputs two vectors specifying data elements to be multiplied together and a third vector of data elements to be added to the result of the multiplication. Again, such instructions could be implemented using a first and second form which target the odd and even numbered elements respectively.

The examples above number the elements so that the least significant data element of a vector is element 0. In other examples the least significant element could be considered to be element 1. While this will change which particular elements are regarded as odd-numbered or even-numbered, there is still one form of the instruction which targets the odd-numbered elements and another form which targets the even-numbered elements.

Figure 10:
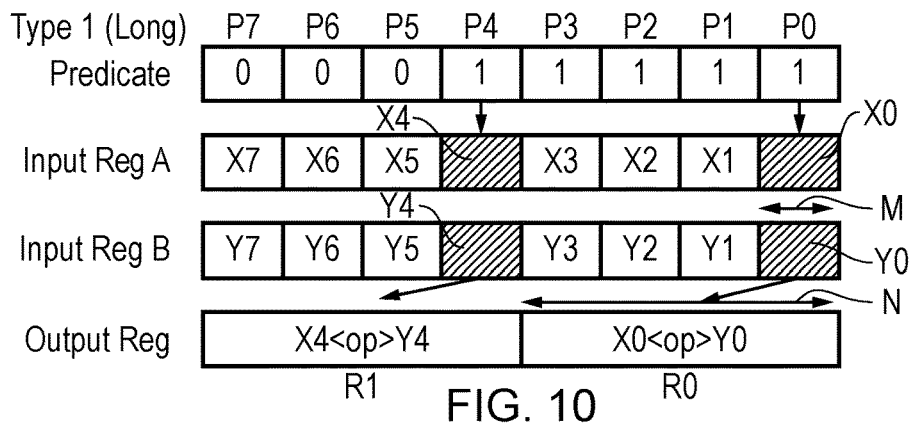
FIGS. 10 to 13 show examples of first, second, third and fourth forms of an element size increasing instruction for operating on respective interleaved subsets of data elements.
Figure 11:
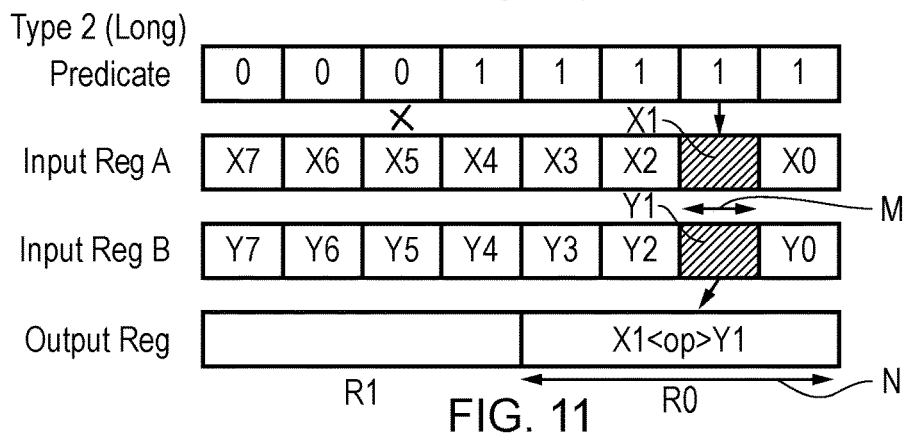
Figure 12:
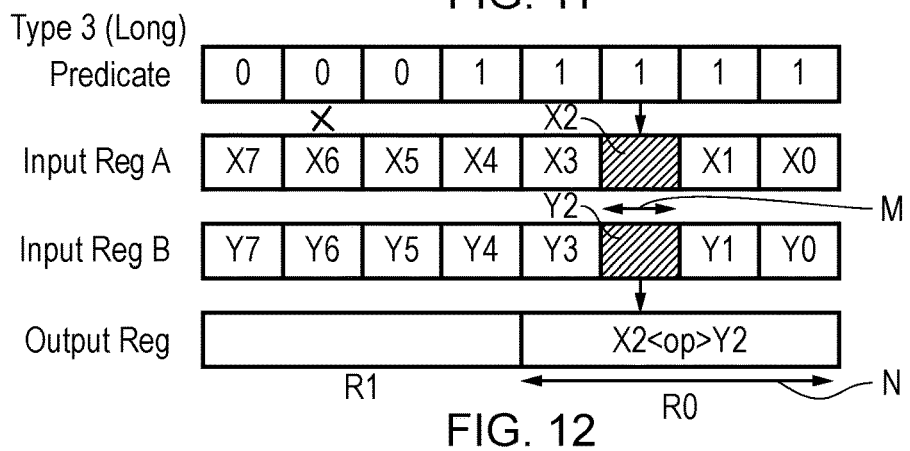
Figure 13:
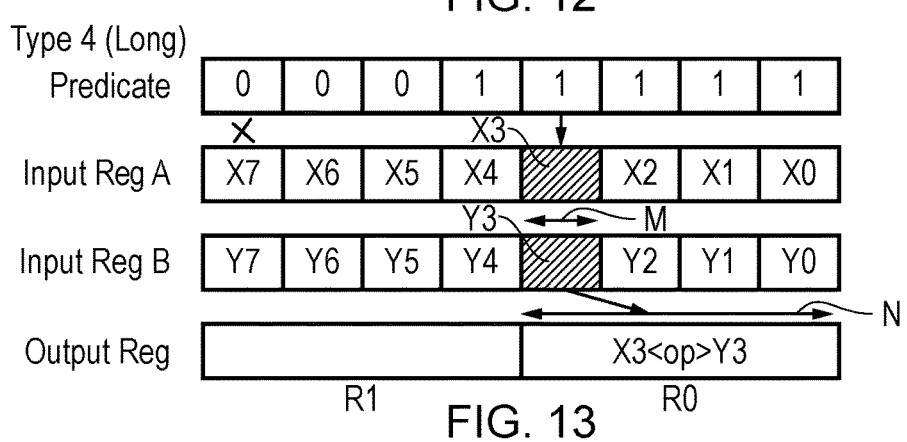

The examples above show cases where N=2M. However, other instructions may implement greater scaling of element size, and more than two forms of the instruction can be implemented to select respective subsets of elements from the input registers for forming the result elements. For example, as shown in FIGS. 10 to 13, when N=4M, four forms of the instruction can be provided for selecting respective first to fourth subsets of the input data elements which are at interleaved positions within the input register. For example as shown in FIG. 10 the first form of the instruction may target a first subset of elements 0, 4, the second form of the instruction shown in FIG. 11 may target a second subset of elements 1, 5, the third form of the instruction shown in FIG. 12 may target a third subset of elements 2, 6 and the fourth form of the instruction shown in FIG. 13 may target a fourth subset of elements 3, 7. More generally, the first subset will correspond to those elements whose element number modulo 4 is 0, and the second to fourth subsets correspond to those elements whose element number modulo 4 is 1, 2 and 3 respectively. Again, FIGS. 10 to 13 show an example where each form of the instruction uses a different interleaved subset of the mask bits (P0, P4 in FIG. 10; P1, P5 in FIG. 11; P2, P6 in FIG. 12; and P3, P7 in FIG. 13), but again it would also be possible to use the same mask bits for each form of the instruction (e.g. using mask bit P0 for result element R0 and mask bit P4 for result element R1 for all four forms of the instruction). Lanes where the relevant mask bit is 0 are set independently of the result of the processing operation <op> on the corresponding data elements.

FIGS. 10-13 show an example for the "lengthening" instruction where the input vectors have the same sized elements, but similarly the "widening" instruction or conversion instruction shown in FIGS. 6 to 9 could also be expanded to four forms implementing a 4× scaling of data element size.

Similarly, other multiples of increase in precision could be implemented with further forms of the instruction. For example to increase the precision by eight times (N=8M), eight forms of the instruction could be provided which pick out first to eighth subsets of elements respectively, where the positions of the first to eighth elements in the input vector are again at interleaved positions.

In the examples above, the input vector A comprises 8 M-bit data elements, but it will be appreciated that the technique could be applied to vectors of other numbers of elements (other vector lengths).

Figure 14:
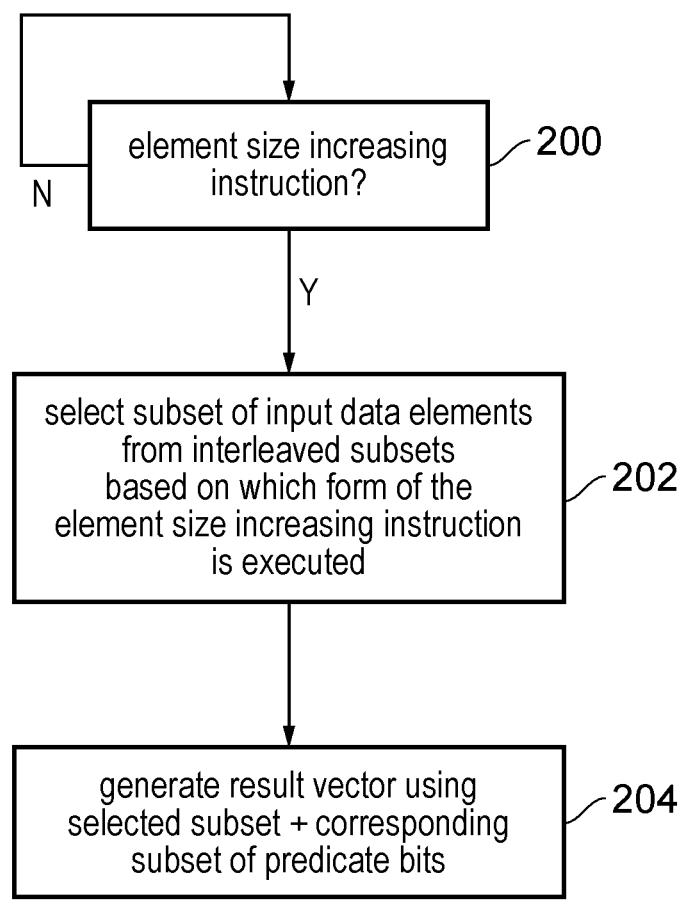
FIG. 14 is a flow diagram showing a method of processing an element size increasing instruction.

FIG. 14 shows a method for processing an element size increasing instruction. At step 200 the processing circuitry determines whether an element size increasing instruction is being executed. If not then this instruction is processed in another way and then the processing returns to step 200. When an element size increasing instruction is executed, at step 202 the processing circuitry selects a subset of data elements of at least the first input vector. The subset is selected from among a number of interleaved subsets of data elements, depending on which form of the element size increasing instruction is currently executed. For the examples of FIGS. 2, 3A/3B, and 6 to 9 this would be either the first subset corresponding to even-numbered elements (for the type 1 instruction) or the second subset corresponding to odd-numbered elements (for the type 2 instruction). For the example of FIGS. 10 to 13, the selected subset would be one of the four subsets corresponding to the elements for which the element number modulo 4 is 0, 1, 2, or 3 respectively. In the case of a lengthening instruction, the subset of elements selected from the second input vector (or third input vector if required) is selected in the same way as for the first input vector. For a widening instruction, the second input vector has the same size elements as the result and so the same elements are selected from the second input vector for each form of the instruction. For a conversion instruction there is only one input vector. At step 204, the processing circuitry generates a result vector using the selected subset of input data elements and a subset of predicate bits (which may be selected based on the form of the instruction or may be the same for all forms as discussed above).

Figure 15:
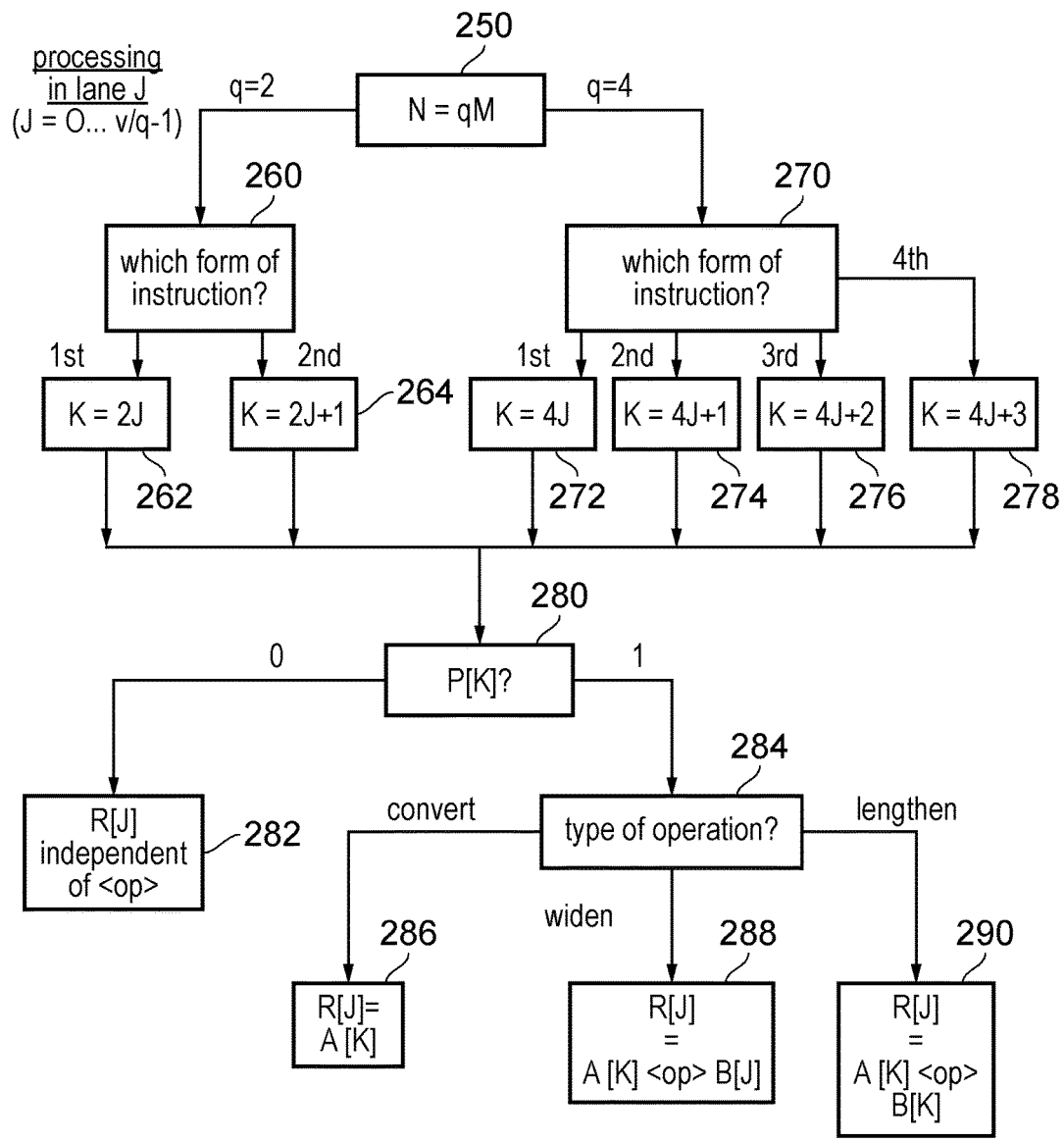
FIG. 15 is a flow diagram showing an example of processing data elements in a given lane of vector processing in response to an element size increasing instruction.

FIG. 15 is a flow diagram showing a specific example of the processing of steps 202 and 204 in more detail. FIG. 15 uses the following notation:

N=the number of bits in each data element of the result vector R

M=the number of bits in each data element of the first input vector A q=the scaling factor for the element size increase (N=qM)

V=the number of vector elements in the first input vector A

The first input vector A comprises V data elements of M bits each, numbered A[0] to A[V−1].

The result vector comprises V/q data elements of N bits each, numbered R[0] to R[V/q−1].

For a widening instruction, the second input vector B comprises V/q data elements of N bits each, numbered B[0] to B[V/q−1].

For a lengthening instruction, the second input vector B comprises V data elements of M bits each, numbered B[0] to B[V−1]

FIG. 15 shows a single lane of processing for generating result data element R[J]. This method can be repeated for each lane where J is between 0 and V/q−1. In some systems, the processing circuitry may have circuit hardware for processing each lane in parallel. Other systems may perform the processing for each lane sequentially so that the input data elements from a given vector are passed one by one through a single hardware unit which over multiple cycles generates the result data elements for each respective lane. Other systems may use a combination of these approaches where two or more lanes (not all the lanes) can be processed in parallel, but processing of the full vector requires multiple passes of the hardware.

K in FIG. 15 represents the M-bit data element of the first input vector which corresponds to result data element R[J], which is selected based on the form of the instruction being executed.

As shown in FIG. 15, at step 250, it is determined what factor increase in precision is being implemented using the current element size increasing instruction (i.e. the value of q is determined). If q=2 (a doubling of data element size), then at step 260 it is determined which form of the instruction is executed. For q=2, there are two forms of instruction. If the current instruction is of the first form, then at step 262 K=2J, and if the current instruction is of the second form, then at step 264 K=2J+1. On the other hand, if q=4 at step 250, then at step 270 the current form of instruction being executed is determined. If the instruction is of the first form, then K=4J (step 272). If the instruction is of the second form, then K=4J+1 (step 274). If the instruction is of the third form, then K=4J+2 (step 276). If the instruction is of the fourth form, then K=4J+3 (step 278).

Note that steps 262-264 collectively define a group of two M-bit data elements A[2J] and A[2J+1] whose bit position in the input vector A is coincident with the bit position of the result data element R[J] in the result vector. Similarly, steps 272-278 define a group of four M-bit data elements A[4J], A[4J+1], A[4J+2], A[4J+3] whose bit position in input vector A is coincident with the bit position of the result data element R[J] in the result vector R. This means that for any given result data element R[J] being generated, the corresponding input data element A[K] always has a bit position which overlaps with the bit position of part of the result data element, regardless of the form of the instruction. This means that the long cross-paths can be avoided in the hardware design as discussed above. Also, note that repeating the method of FIG. 15 for each lane (i.e. for each value of J between 0 and V/q−1) will result in each form of the instruction selecting a corresponding interleaved subset of data elements.

Although not shown in FIG. 15, if q is higher than 4 (e.g. 8 or 16), then further forms of the instruction will pick out further subsets of elements. In general, for a power of 2 value of q, there may be q forms of the instruction, and the subset of elements picked out by a $p^{th}$ form of the instruction is the elements whose element number satisfies K=qJ+p where J is again between 0 and V/q−1.

After steps 250 to 278 establish which input data element A[K] corresponds to result data element R[J], at step 280 the predicate bit P[K] for that input element is checked. If P[K] is 0, then at step 282 the result data element R[J] is determined with a value independent of the result of performing the predetermined operation <op> using the input element A[K]. As mentioned above, R[J] could be set to a predetermined value (e.g. 0), the input element A[K] could be mapped direct to an N-bit value of R[J], or R[J] could retain the same value that was previously stored in the corresponding part of the output register. In all three cases, R[J] is independent of the result of the operation <op> (although note that in the second case R[J] could still depend on the input element A[K]).

If the predicate bit P[K] is 1, then at step 284 the type of the operation to be performed is checked (this can be determined from the instruction opcode). If the instruction is a conversion instruction, then at step 286 the result data element R[J] is set to a higher precision representation of the numeric value of the input element A[K]. If the instruction is a widening instruction, then at step 288 R[J] is set equal to the result of performing the predetermined operation <op> on element A[K] of the first input vector A and element B[J] of the second input vector B. On the other hand, if the instruction is a lengthening instruction, then at step 292 R[J] is set equal to the result of performing the operation <op> on element A[K] of input vector A and element B[K] of input vector B.

FIG. 15 shows a particular example but it will be appreciated that other instructions could be implemented in a different way. For example, at step 280, rather than selecting the predicate bit P[K] corresponding to the input element A[K] being used to generate the result element R[J], which will vary depending on the form of the instruction being executed, the same predicate bit P[J] could be selected for all forms of the instruction as in the example of FIG. 3B discussed above. Also, for some operations such as multiply-add, the operation at steps 288 or 290 may be performed using three vector elements from vectors A, B, C. The vector elements from vectors B and C may be either an N-bit element B[J], C[J] or an M-bit element B[K], C[K].

The different forms of the instruction could in some examples be distinguished by different opcodes, e.g.:

ADDLONG1 R4, R1, R2
ADDLONG2 R4, R1, R2.

Alternatively, the different forms of the instruction could have the same opcode but include a field specifying the form of instruction:

ADDLONG R4, R1, R2, 1
ADDLONG, R4, R1, R2, 2.

The examples above show cases where VL/N is an integer, where VL is the vector length (total number of bits) of the input vectors and result vector. However, some systems may support processing of vector lengths which are not an integer multiple of N.

Figure 16:
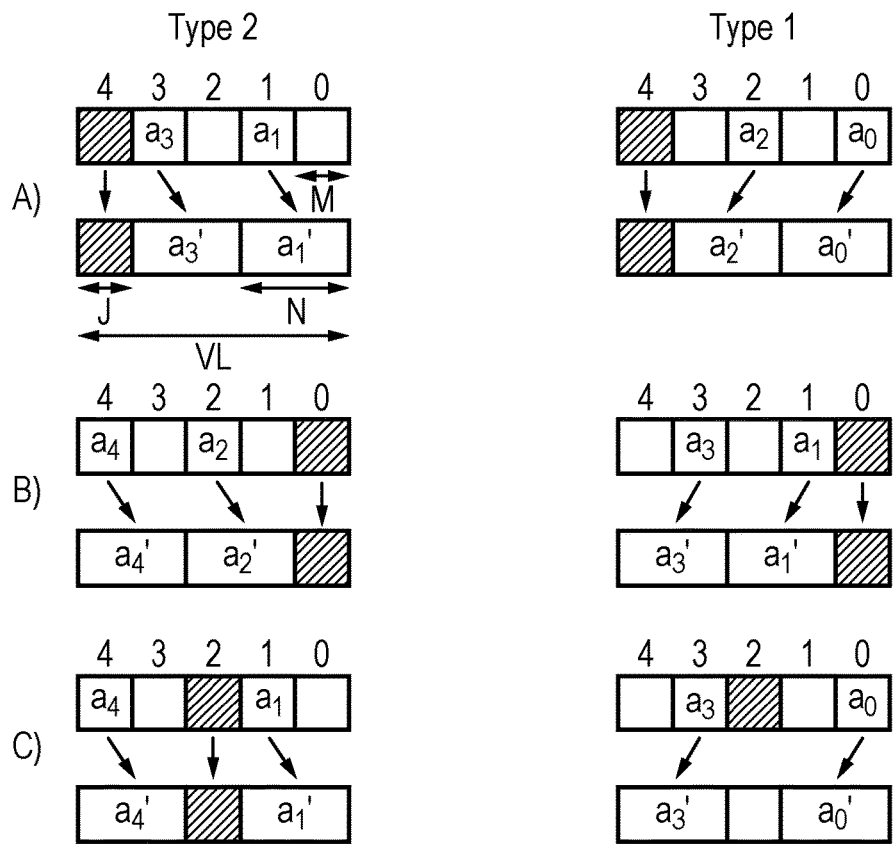
FIG. 16 shows examples of processing vectors with a vector length which is not an exact multiple of the N-bit result data element size.

FIG. 16 shows some examples of how such operations may be handled. When VL/N is not an integer, the result vector may include at least one smaller J-bit data element in addition to one or more N-bit data elements. For example, FIG. 16 shows an example where J=M, VL=5M and N=2M, and so while 2 N-bit elements can be generated using corresponding M-bit elements of the input vector selected depending on whether the type 1 or type 2 instruction is executed, there is one "spare" M-bit element of the input vector for which there is not enough space in the result vector for expanding that element into an N-bit result element. Depending on the relative sizes of N and VL, there may sometimes be more than one spare element.

As shown in parts A), B) and C) of FIG. 16, there are different approaches for selecting which elements of the input vector are spare elements which do not map to a corresponding N-bit element. In this example, the vector length is such that there is only one spare element, but for a longer vector there could be two or more spare elements, depending on the values of VL, M and N. The spare element in each case is shown shaded in FIG. 16.

In the example A) of FIG. 16, the spare elements are selected from the most significant end of the input vector. In example B), the spare elements are selected from the least significant end of the input vector. In example C), the spare element is selected at an arbitrary position within the vector. Some versions of the instructions may assume that the spare elements should always by default be at the least or most significant end of the vector. Other versions may allow the position of the spare element to be specified, e.g. in a field of the instruction encoding.

The remaining (non-spare) elements are processed in a similar way to the techniques discussed above, with a subset of input elements being selected depending on the type of the instruction executed, and expanded to generate corresponding N-bit data elements of the result. The first and second subsets may correspond to alternate non-spare elements. Depending on the position of the spare element(s) this may not correspond exactly to the odd- and even-numbered elements of the input vector. For instance, in example C of FIG. 16 the first subset comprises elements a0, a3 and the second subset comprises elements a1, a4. Nevertheless, the first and second subsets are interleaved within the input vector.

For the spare elements, these can be treated effectively as an inactive element. For example, the spare element could remain untouched within the destination register storing the result vector (preserving the previous value in this portion of the destination register), or the unused element of the input could be copied directly across to the corresponding element of the result vector.

Figure 17:
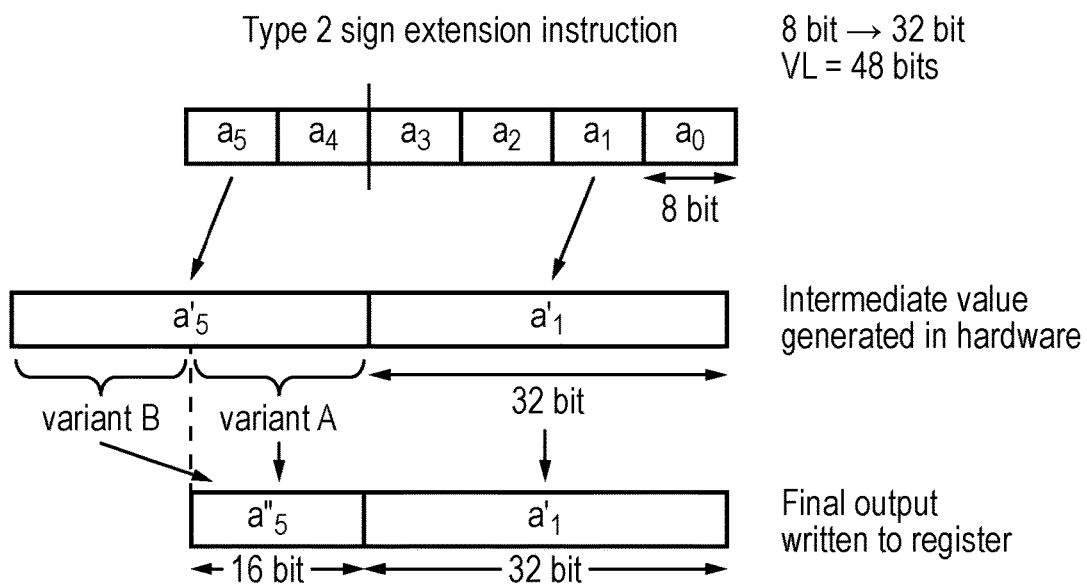
FIG. 17 shows an example of generating at least one result data element with fewer than N bits.

Another option for the spare elements is to perform the same operation on the spare M-bit element as if a corresponding N-bit result was generated, but then write a J-bit portion of the intermediate N-bit result to the corresponding J-bit element of the result vector. An example of this is shown in FIG. 17. In this example, VL=48 bits, M=8 bits, N=32 bits, and J=16 bits. As N/M=4 there are four forms of the element size increasing instruction as in FIGS. 10 to 13. FIG. 17 shows an example for the type 2 instruction which selects a second subset of elements a1, a5 of the input vector. The bottom element a'1 of the result value is generated based on the corresponding element a1 of the second subset in the usual way. For the top 16-bit element of the result, the corresponding 8-bit element a5 of the input vector is processed to generate a 32-bit intermediate result a'5, and then 16 bits of the intermediate result are selected and written to the 16-bit element a"5 of the result vector. Different variants of each type of instruction could be provided for selecting different J-bit portions of the N-bit intermediate result for writing to the result vector—e.g. in this example a variant A could select the lower 16 bits and a variant B could select the upper 16 bits. For the type 1 instruction, the 16-bit element of the result would be generated based on input element a4 instead of a5. For the type 3 and 4 instructions, as there are no corresponding elements a6, a7 of the input vector that would normally be selected from the third/fourth subsets, the upper element of the result vector may be treated as an inactive lane and generated in any of the ways discussed above for inactive lanes.

For conciseness, FIGS. 16 and 17 show examples where there is only one input vector (e.g. an instruction for changing the precision or format of the input data elements). However, it will be appreciated that a similar approach can be taken for arithmetic/logical instructions which use more than one input vector where the vector length is not an exact multiple of N.

Figure 18:
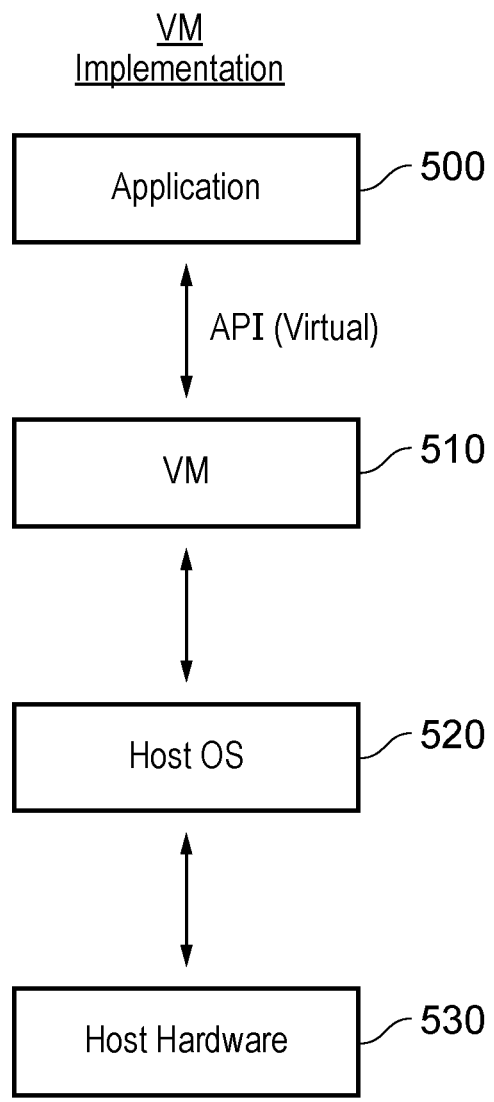
FIG. 18 shows an example of a virtual machine implementation.

FIG. 18 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing method comprising:
   decoding an element size increasing instruction;
   in response to the decoded element size increasing instruction identifying at least a first input vector comprising a plurality of M-bit data elements, generating a result vector comprising a plurality of result data elements, where the result data elements comprise at least one N-bit data element, where N>M;
   wherein in response to a first form of the element size increasing instruction, the result vector is generated using a first subset of data elements of the first input vector;
   in response to a second form of the element size increasing instruction, the result vector is generated using a second subset of data elements of the first input vector; and
   positions of the first subset of data elements in the first input vector are interleaved with positions of the second subset of data elements in the first input vector;
   the method further comprising providing mask information specifying a mask comprising a plurality of mask values for indicating which bit of the M-bit data elements of the first input vector are active data elements; wherein
   the result vector is generated in dependence on the mask;
   in response to the first form of the element size increasing instruction, the result vector is generated using the first subset of data elements and the mask values in a first subset of the mask values independent of a second subset of mask values;
   in response to the second form of the element size increasing instruction, the result vector is generated using the second subset of data elements and the mask values in the second subset of the mask values independent of the first subset of mask values; and
   positions of the first and second subsets of the mask values are interleaved in the mask.

2. An apparatus comprising:
   means for decoding an element size increasing instruction;
   means for generating, in response to the decoded element size increasing instruction, a result vector comprising a plurality of result data elements, the element size increasing instruction identifying at least a first input vector comprising a plurality of M-bit data elements, where the result data elements comprise at least one N-bit data element, where N>M;
   wherein in response to a first form of the element size increasing instruction, the means for generating is configured to generate the result vector using a first subset of data elements of the first input vector;
   in response to a second form of the element size increasing instruction, the means for generating is configured to generate the result vector using a second subset of data elements of the first input vector; and
   positions of the first subset of data elements in the first input vector are interleaved with positions of the second subset of data elements in the first input vector;
   the apparatus further comprising one or more predicate registers to provide mask information specifying a mask comprising a plurality of mask values for indicating which bit of the M-bit data elements of the first input vector are active data elements; wherein
   the means for generating is configured to generate the result vector in dependence on the mask;
   in response to the first form of the element size increasing instruction, the means for generating is configured to generate the result vector using the first subset of data elements and a first subset of the mask values independent of a second subset of mask values;
   in response to the second form of the element size increasing instruction, the means for generating is configured to generate the result vector using the second subset of data elements and the second subset of the mask values independent of the first subset of mask values; and
   positions of the first and second subsets of the mask values are interleaved in the mask.

3. An apparatus comprising:
   decode circuitry configured to decode an element size increasing instruction;
   processing circuitry configured, in response to the decoded element size increasing instruction, to generate a result vector comprising a plurality of result data elements, the element size increasing instruction identifying at least a first input vector comprising a plurality of M-bit data elements, where the result data elements comprise at least one N-bit data element, where N>M;
   wherein in response to a first form of the element size increasing instruction, the processing circuitry is configured to generate the result vector using a first subset of data elements of the first input vector;
   in response to a second form of the element size increasing instruction, the processing circuitry is configured to generate the result vector using a second subset of data elements of the first input vector; and
   positions of the first subset of data elements in the first input vector are interleaved with positions of the second subset of data elements in the first input vector;
   the apparatus further comprising one or more predicate registers to provide mask information specifying a mask comprising a plurality of mask values for indicating which bit of the M-bit data elements of the first input vector are active data elements; wherein
   the processing circuitry is configured to generate the result vector in dependence on the mask;
   in response to the first form of the element size increasing instruction, the processing circuitry is configured to generate the result vector using the first subset of data elements and a first subset of the mask values independent of a second subset of mask values;
   in response to the second form of the element size increasing instruction, the processing circuitry is configured to generate the result vector using the second subset of data elements and the second subset of the mask values independent of the first subset of mask values; and
   positions of the first and second subsets of the mask values are interleaved in the mask.

4. The apparatus according to claim 3, wherein in response to the element size increasing instruction, the processing circuitry is configured to generate a given N-bit data element of the result vector in dependence on a corresponding M-bit data element of the first input vector selected in dependence on which form of the element size increasing instruction is processed by the processing circuitry.

5. The apparatus according to claim 3, wherein each N-bit data element of the result vector corresponds to a group of M-bit data elements of the first input vector, the group comprising one M-bit data element from each of the first and second subsets, and bit positions of the N-bit data element within the result vector are coincident with bit positions of the corresponding group of M-bit data elements in the first input vector; and the processing circuitry is configured to generate a given N-bit data element of the result vector in dependence on one of the corresponding group of M-bit data elements selected in dependence on which form of the element size increasing instruction is processed by the processing circuitry.

6. The apparatus according to claim 3, wherein in response to both the first and second forms of the element size increasing instruction, the processing circuitry is configured to generate the result vector using a first subset of the mask values.

7. The apparatus according to claim 3, wherein $N=2M$;
the first subset of data elements comprises even-numbered data elements of the first input vector; and
the second subset of data elements comprises odd-numbered data elements of the first input vector.

8. The apparatus according to claim 3, wherein $N=4M$;
in response to a third form of the element size increasing instruction, the processing circuitry is configured to generate the result vector using a third subset of data elements of the first input vector;
in response to a fourth form of the element size increasing instruction, the processing circuitry is configured to generate the result vector using a fourth subset of data elements of the first input vector; and
positions of the first, second, third and fourth subsets of data elements in the first input vector are interleaved.

9. The apparatus according to claim 3, wherein $N=8M$;
in response to third to eighth forms of the element size increasing instruction, the processing circuitry is configured to generate the result vector using third to eighth subsets of data elements of the first input vector respectively; and
positions of the first to eighth subsets of data elements in the first input vector are interleaved.

10. The apparatus according to claim 4, wherein each M-bit data element of the first input vector is associated with a mask value indicating whether the M-bit data element is active or inactive, and
for each N-bit data element of the result vector:
when the corresponding M-bit data element of the first input vector is active, the processing circuitry is configured to generate the N-bit data element in dependence on a result of a predetermined operation applied to the corresponding M-bit data element; and
when the corresponding M-bit data element is inactive, the processing circuitry is configured to generate the N-bit data element with a value independent of the result of the predetermined operation applied to the M-bit data element.

11. The apparatus according to claim 3, wherein the result vector comprises at least one J-bit data element, where $J<N$.

12. The apparatus according to claim 11, wherein the processing circuitry is configured to generate said J-bit data element with a value corresponding to a J-bit portion of an N-bit result of performing a predetermined processing operation using a corresponding M-bit data element of the first input vector.

13. The apparatus according to claim 4, wherein the processing circuitry is configured to generate the given N-bit data element of the result vector by performing a predetermined operation using the corresponding M-bit data element of the first input vector.

14. The apparatus according to claim 13, wherein the predetermined operation comprises a conversion operation to change the precision of the value represented by the corresponding M-bit data element from M bits to N bits.

15. The apparatus according to claim 13, wherein the result of the predetermined operation is dependent on the corresponding M-bit data element of the first input vector and a corresponding M-bit data element of at least one further input vector specified by the element size increasing instruction.

16. The apparatus according to claim 15, wherein the processing circuitry is configured to select the corresponding M-bit data element of the second input vector in dependence on which form of the element size increasing instruction is processed by the processing circuitry.

17. The apparatus according to claim 13, wherein the result of the predetermined operation is dependent on the corresponding M-bit data element of the first input vector and a corresponding N-bit data element of at least one further input vector specified by the element size increasing instruction.

18. The apparatus according to claim 3, wherein the first and second forms of the element size increasing instruction have different opcodes.

19. The apparatus according to claim 3, wherein the first and second forms of the element size increasing instruction have the same opcode, and the element size increasing instruction includes a field identifying whether the instruction is of the first form or the second form.

20. A computer program stored on a non-transitory computer readable storage medium that, when executed by a data processing apparatus, provides a virtual machine which provides an instruction execution environment corresponding to the apparatus of claim 3.

* * * * *